(12) United States Patent
Harrington

(10) Patent No.: US 7,961,905 B2
(45) Date of Patent: Jun. 14, 2011

(54) ENCODING INVISIBLE ELECTRONIC INFORMATION IN A PRINTED DOCUMENT

(75) Inventor: Steven J Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 117 days.

(21) Appl. No.: 12/132,911

(22) Filed: Jun. 4, 2008

(65) Prior Publication Data
US 2008/0267515 A1 Oct. 30, 2008

Related U.S. Application Data

(60) Division of application No. 11/009,857, filed on Dec. 11, 2004, now Pat. No. 7,397,584, which is a continuation of application No. 10/951,394, filed on Sep. 28, 2004, now abandoned.

(51) Int. Cl.
G06K 9/00 (2006.01)

(52) U.S. Cl. .......... 382/100; 358/3.28

(58) Field of Classification Search .......... 382/100; 358/3.28
See application file for complete search history.

(56) References Cited

U.S. PATENT DOCUMENTS

| | | | |
|---|---|---|---|
| 5,539,841 A | 7/1996 | Huttenlocher et al. | |
| 5,684,885 A | 11/1997 | Cass et al. | |
| 5,765,176 A * | 6/1998 | Bloomberg | 715/209 |
| 5,835,638 A | 11/1998 | Rucklidge et al. | |
| 5,946,414 A * | 8/1999 | Cass et al. | 382/183 |
| 6,141,441 A * | 10/2000 | Cass et al. | 382/166 |
| 6,161,971 A * | 12/2000 | Suzuki et al. | 400/120.01 |
| 6,212,234 B1 | 4/2001 | Andoh et al. | |
| 6,330,976 B1 * | 12/2001 | Dymetman et al. | 235/487 |
| 6,366,685 B1 * | 4/2002 | Takaragi | 382/140 |
| 6,442,606 B1 * | 8/2002 | Subbaroyan et al. | 709/224 |
| 6,515,764 B1 | 2/2003 | Knox et al. | |
| 6,556,688 B1 * | 4/2003 | Ratnakar | 382/100 |
| 6,631,495 B2 | 10/2003 | Kato et al. | |
| 6,636,614 B1 * | 10/2003 | Koeppen et al. | 382/100 |
| 6,641,053 B1 | 11/2003 | Breidenbach et al. | |
| 6,644,764 B2 | 11/2003 | Stephens, Jr. | |
| 6,751,343 B1 | 6/2004 | Ferrell et al. | |
| 6,792,129 B1 * | 9/2004 | Zeng et al. | 382/100 |
| 6,831,990 B2 * | 12/2004 | Marvel et al. | 382/100 |
| 6,873,711 B1 * | 3/2005 | Murakami et al. | 382/100 |
| 6,876,763 B2 * | 4/2005 | Sorek et al. | 382/162 |
| 6,912,069 B1 * | 6/2005 | Matsunoshita | 358/3.28 |
| 6,952,799 B2 * | 10/2005 | Edwards et al. | 715/207 |
| 6,956,958 B2 * | 10/2005 | Fan et al. | 382/100 |
| 7,058,196 B2 * | 6/2006 | Takaragi | 382/100 |
| 7,123,742 B2 * | 10/2006 | Chang | 382/100 |
| 7,286,684 B2 * | 10/2007 | Rhoads et al. | 382/100 |
| 7,397,584 B2 * | 7/2008 | Harrington | 358/3.28 |
| 2001/0016058 A1 * | 8/2001 | Zeng | 382/135 |

(Continued)

*Primary Examiner* — Bhavesh M Mehta
*Assistant Examiner* — Sean Motsinger
(74) *Attorney, Agent, or Firm* — MH2 Technology Law Group LLP

(57) ABSTRACT

A printed image can be redundantly encoded by printing a visible image using a colorant with a luminance that contrasts with that of the output sheet and printing a redundant image using a colorant with a luminance that varies only slightly from that of the output sheet. Accordingly, the visible image can be easily read by a user while the redundant image is substantially invisible to the human eye at normal reading distances, yet capable of being captured by a conventional digital scanner. In one aspect, redundantly encoded images may be printed on a white background, with visible images printed in black text and redundant images printed in blue in content regions of the visible image and in yellow in its background regions.

8 Claims, 8 Drawing Sheets

U.S. PATENT DOCUMENTS

2004/0017925 A1* 1/2004 Marvel et al. ................. 382/100
2004/0240704 A1* 12/2004 Reed ............................ 382/100
2005/0063027 A1* 3/2005 Durst, Jr. et al.
2005/0226534 A1* 10/2005 Moroo et al. ................. 382/291

* cited by examiner

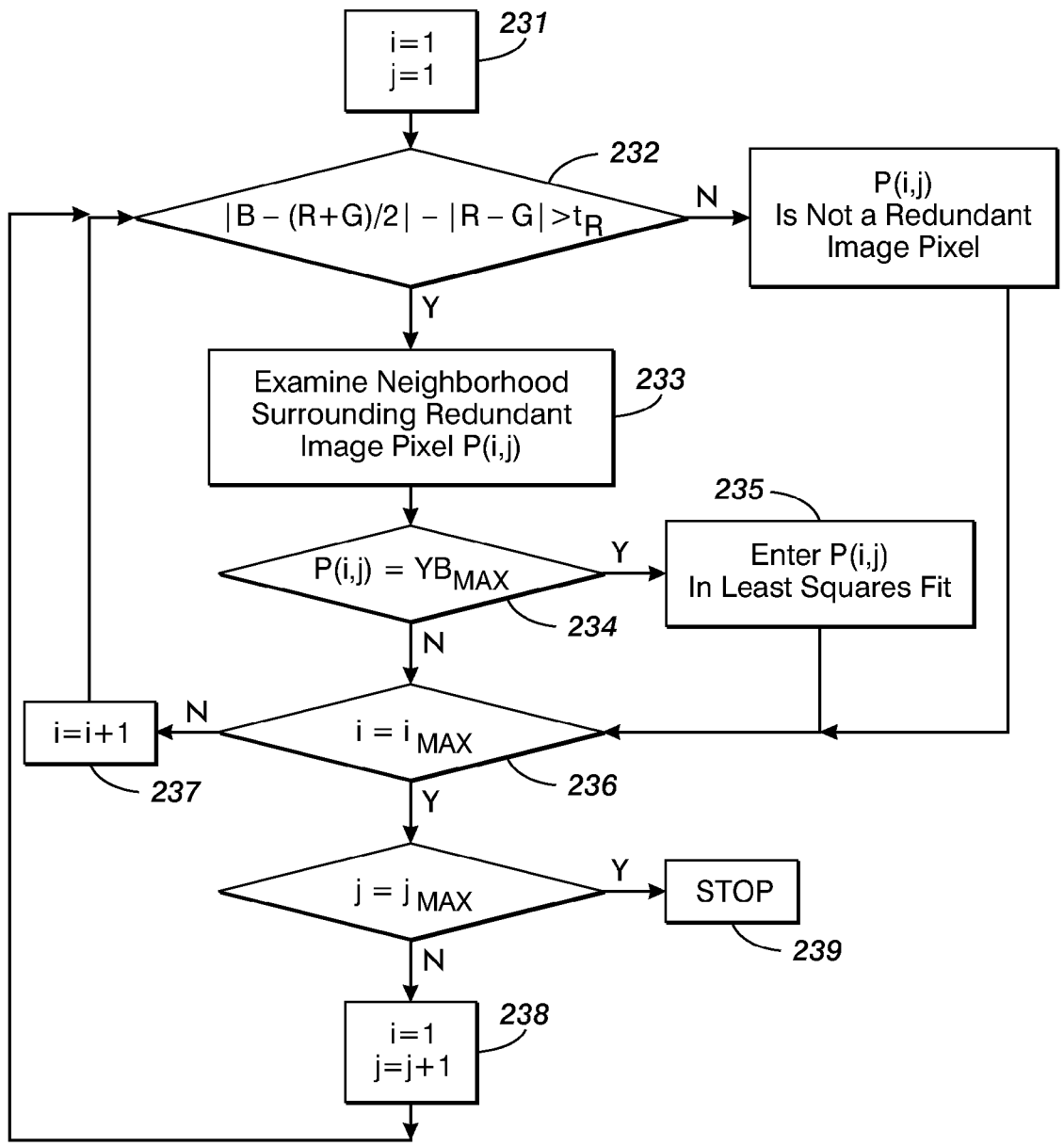

ENCODING INVISIBLE ELECTRONIC INFORMATION IN A PRINTED DOCUMENT

CROSS REFERENCE TO RELATED APPLICATIONS

This is a divisional of pending U.S. patent application Ser. No. 11/009,857 filed Dec. 11, 2004, which is a continuation in part application of pending U.S. patent application Ser. No. 10/951,394 filed Sep. 28, 2004, both assigned to the present assignee.

BACKGROUND

It is often useful to recover the image that was originally printed on a hardcopy document later became altered or damaged. For example, it is often difficult to recreate information that is printed on financial, legal, medical and government, but it is essential that those who rely upon these types of information to know that the information they receive is accurate and complete. Thus, it would be beneficial to provide a way to view the original version of an image that is presented on a printed document, to confirm it accuracy and when necessary, to recover data from a document that has been damaged.

Known image processing methods use "glyphs," i.e., graphical indicia that are used to encode digital information, to print duplicated versions of a digital image on a single document. Unfortunately, glyphs are highly visible and thus, they often detract from the visual appearance of the document. Magnetic inks, gloss marks and other substances that are much less visible are also available, but the costs of providing the equipment that is required to capture the data often renders the use of those substances impractical.

Available software programs can highlight changes in electronic versions of a modified image for comparison purposes. Those programs cannot, however, identify and highlight changes that are made to printed data. It is also relatively easy to deliver editing history with electronically stored documents. Unfortunately that information is lost when the document is printed, even if the hardcopy document is scanned and the image is returned to electronic storage.

Accordingly, it would be advantageous to be able to redundantly encode image data on a hardcopy document, to do so without altering the visual appearance of the document and to enable the redundant versions of the image to maintain their association as the hardcopy document is digitally captured, processed and printed.

PRIOR ART

U.S. Pat. No. 5,835,638 discloses a method and apparatus for comparing symbols extracted from binary images of text for classifying into equivalence classes using a Hausdorff-like method for comparing symbols for similarity. When a symbol contained in a bitmap A is compared to a symbol contained in a bitmap B, it is determined whether or not the symbol in bitmap B fits within a tolerance into a dilated representation of the symbol in bitmap A with no excessive density of errors and whether the symbol in bitmap A fits within a tolerance into a dilated representation of the symbol in bitmap B with no excessive density of errors. If both tests are passed, an error density check is performed to determine a match.

U.S. Pat. No. 5,539,841 discloses a method for comparing two image sections consisting of a plurality of image signals, or pixels, where each image section represents a token (e.g., character, symbol, glyph, string of components, or similar units of semantic understanding), in order to identify when similar tokens are present within the image sections.

SUMMARY

Aspects disclosed herein provide a digital printing system that includes an image processor configured to generate binary printer signals that represent an encoded image inside a scan image, wherein the encoded image includes a visible representation of a presented image and has a substantially invisible representation of an original image printed among the presented image; a print channel configured to receive the binary printer signals from the image processor as a plurality of separations; an encoded image analyzer configured to obtain an encoding transformation function used to position pixels corresponding to the substantially invisible original image representation among the original image; an original image location identifier that identifies pixels in the scan image that correspond to locations of the substantially invisible original image representation and applies a decoding transformation function to the substantially invisible original image representation corresponding pixels; an original image recovery device configured to assign a selected grayscale value to each pixel of the substantially invisible original image representation identified by the decoding transformation function; and an output generator configured to generate a visible representation of the original image.

In one aspect, a method includes digitally capturing grayscale pixels that represent an encoded image inside a scan image, wherein the encoded image includes a visible representation of a presented image and has a substantially invisible representation of an original image printed among the presented image; identifying an encoding transformation function used to position pixels corresponding to the substantially invisible original image representation among the original image; locating pixels in the scan image that correspond to locations of the substantially invisible original image representation; applying a decoding transformation function to the substantially invisible original image representation corresponding pixels to locate pixels corresponding to the original image; and assigning a selected grayscale value to each of the original image corresponding pixels.

In another aspect, a method includes generating image data that provides a digital representation of an original image; providing an encoding transformation function for positioning pixels of a substantially invisible representation of the original image inside the original image; printing the original image an output copy sheet; and printing the substantially invisible original image representation on the output copy sheet, with pixels of the substantially invisible original image representation dispersed among the original image.

In yet another aspect, a data encoder includes an input channel configured to receive pixel values that digitally represent an original image; a redundant image pixel selector configured to provide an encoding transformation function that maps pixels belonging to a substantially invisible representation of the original image to corresponding pixels in a visible representation of the original image; a visible image generator configured to print the visible original image representation on an output copy sheet using a colorant whose luminance value differs substantially from a luminance value of a print location for the visible image representation; and a redundant image generator configured to print the substantially invisible original image representation using a colorant whose luminance value is substantially the same as a luminance value for a pixel identified by the encoding transformation function.

In still another aspect, a data encoder includes an input channel configured to receive pixel values that digitally represent an original image; a redundant image pixel selector configured to provide an encoding transformation function that maps pixels belonging to a substantially invisible representation of the original image to corresponding pixels in a visible representation of the original image; a visible image generator configured to visibly display the visible original image representation in color whose luminance value differs substantially from a luminance value of a region surrounding the visible image representation; and a redundant image generator configured to display the substantially invisible original image representation in a color whose luminance value is substantially the same as a luminance value of a surrounding location.

BRIEF DESCRIPTION OF THE DRAWINGS

FIG. 9 is a flow chart showing a method of refining a transformation function such as that derived in the example of FIG. 8.

DETAILED DESCRIPTION

Figure 1:
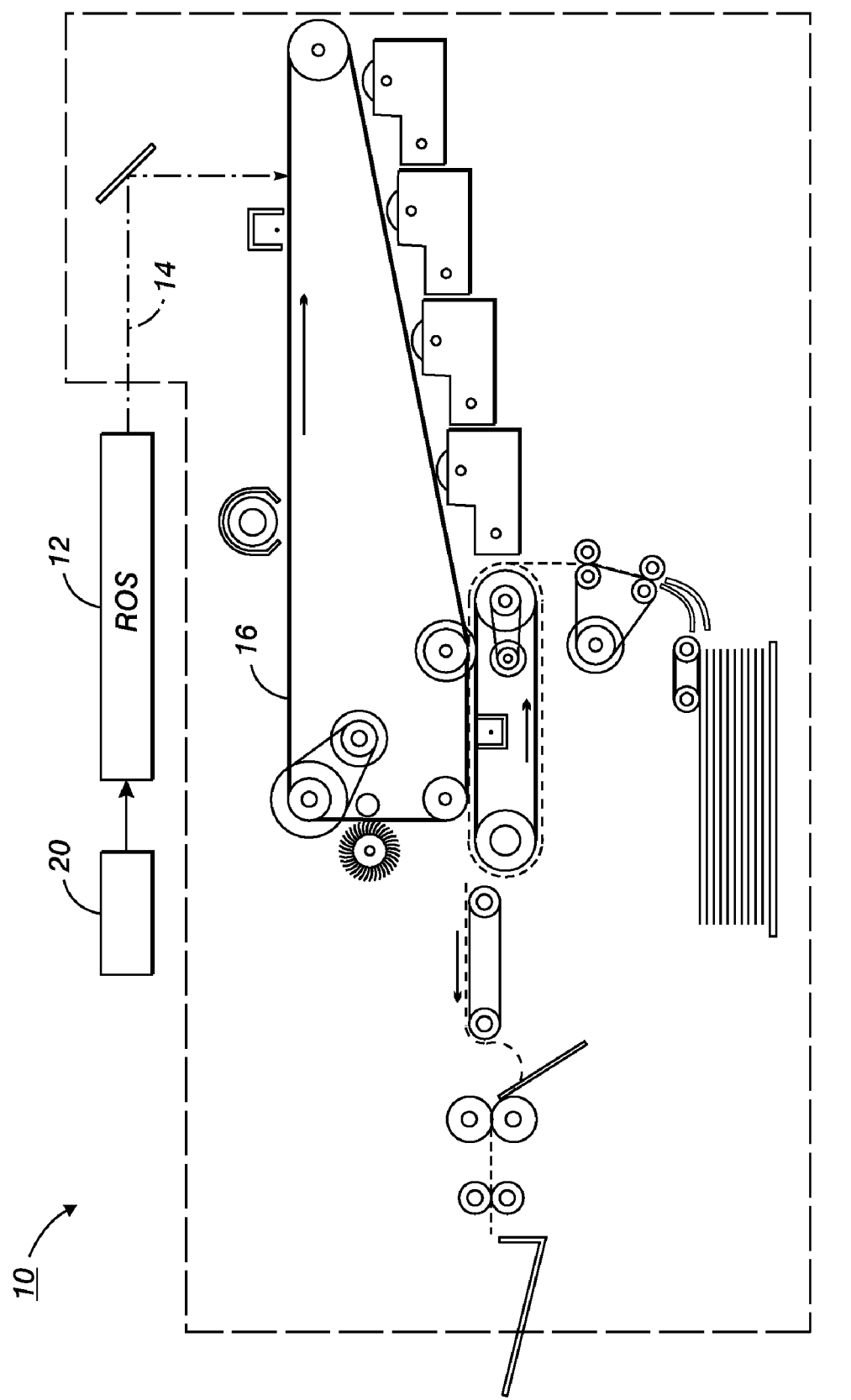
FIG. 1 is a simplified diagram showing the basic elements of a color digital printer.

For a general understanding of the present invention, reference is made to the drawings, where like reference numerals have been used throughout to designate identical elements. In describing the present invention, "a" means "one or more" and a "plurality" means "more than one." the following term(s) have also been used in the description:

"Data" refers to electronic signals that indicate or include information. Data may exist in any physical form, including electromagnetic or other transmitted signals, signals that are stored in electronic, magnetic, or other form or signals that are transitory or are in the process of being stored or transmitted.

"Viewable data" refers to data that typically can be perceived by the human visual system. In contrast, "substantially invisible data" is data that present but is barely detectable or undetectable by the human eye at a typical viewing distance.

An "image" is generally a pattern of physical light that may include characters, words, and text as well as other features such as graphics. An image is typically represented by a plurality of pixels that are arranged in scanlines.

An "input image" is an image that has been generated by an external source or process that is presented to the reference system for processing.

A "document" includes any medium that is capable of bearing a visible image.

An "original document" is a document that bears an input image.

A "separation" is a bitmap of image signals that is used to drive a printer produce a monochromatic image.

A "pixel" is a digital signal that represents the optical density of the image in a single separation at a discrete location.

A "color pixel" refers to the set of color densities of corresponding pixels in each separation.

"Grayscale" means having multiple intensity levels that correspond to respective optical density values. For a given device, the number of available grayscale levels is determined by its bit depth. "Grayscale value" refers to the numerical value that represents a single intensity level in a range that varies between a minimum intensity level and a maximum intensity level. A grayscale value is assigned to each pixel in a digital image to indicate the optical density of the image at the corresponding location.

"Color" is the appearance of an object as perceived by a viewer depending upon the hue, brightness and saturation of light reflected from the object.

A "color image" is an image formed by superimposing multiple monochromatic separations, each of which reproduces a color of the image.

A "neighborhood" is a group of pixels that lie adjacent to or surround a reference pixel in an image. It is typically described by its size and shape.

"Resolution" is a number that describes pixels in an output device. For a video display, resolution is typically expressed as the number of pixels on the horizontal axis and the number of pixels on the vertical axis. Printer resolution is often expressed in terms of "dots-per-inch" i.e., the number of drops of colorant that can be printed within an inch on the page, which is often, but not necessarily, the same in both directions.

A "redundantly encoded digital image" refers to data that provides a digital representation of the information that is required to reproduce a human readable image.

There are many ways to digitally reproduce images. For example, digital cameras, scanners and other image capture devices generate digital reproductions of analog data and several available software applications enable users to create text and graphic images in digital format. Digital image data can also be received via electronic transmission and retrieved from storage. Regardless of how it is created, digital information can be printed, transmitted and displayed by printers, video monitors, fax machines and other output devices.

In a typical color system, color documents are represented by multiple separations of grayscale image data, each of which provides the pixels that drive a printer to produce one layer of color in an image. Color images are formed by combining the optical density values for corresponding pixels in respective separations. As illustrated in FIG. 1, a digital printer 10 reproduces color images by processing binary "CMY" image data to generate multiple image separations that are used to print cyan (C), magenta (M) and yellow (Y) colors (and optionally and black (K) color in lieu of or in addition to cyan, magenta and yellow) on an output sheet.

In one aspect, a digital printer 10 may include a raster output scanner (ROS) 12 that drives a modulated a light 14 in response to electronic signals 18 that are independently generated by an image processor (IP) 20 for the respective separations. Modulated light 14 exposes the surface of a uniformly charged photoconductive imaging member 16 to achieve a set of subtractive latent images that are subsequently developed by depositing (K), C, M and Y colorants onto the charge retaining locations. The developed images are then transferred to an output sheet in superimposed registration with one another and fused to the sheet to form a color hardcopy document 50.

Each of the aforementioned colorants absorbs light in a limited spectral region of the range of visible light; cyan colorant absorbs red light, i.e., prevents light having a wavelength of approximately 650 nm from being reflected from the image, magenta colorant absorbs green light (light having a wavelength of approximately 510 nm) and yellow colorant absorbs blue light (light having a wavelength of approximately 475 nm). Black colorant absorbs all wavelengths of light and can be deposited onto the latent image rather than depositing all three colorants at the same location.

Accordingly, all of the printable colors can be produced by combining the different colorants in various ratios. For example, to generate a blue region in a hardcopy image, relatively high amounts of colorant will be deposited onto corresponding locations of the C and M separations, with little or no colorant deposited in the corresponding location of the Y separation. The cyan and magenta colorants will absorb the red and green light and thus, only blue light will be reflected from the document and perceived by the viewer. In other words, the intensity of blue light that will be reflected from the image is controlled by the output of the channel of printer 10 that controls the deposit of yellow colorant. Similarly, the intensity of red light that will be reflected from the image is controlled by the output of the channel of printer 10 that controls the deposit of cyan colorant and the intensity of green light is controlled by the output of the channel of printer 10 that controls the deposit of magenta colorant.

Figure 2:
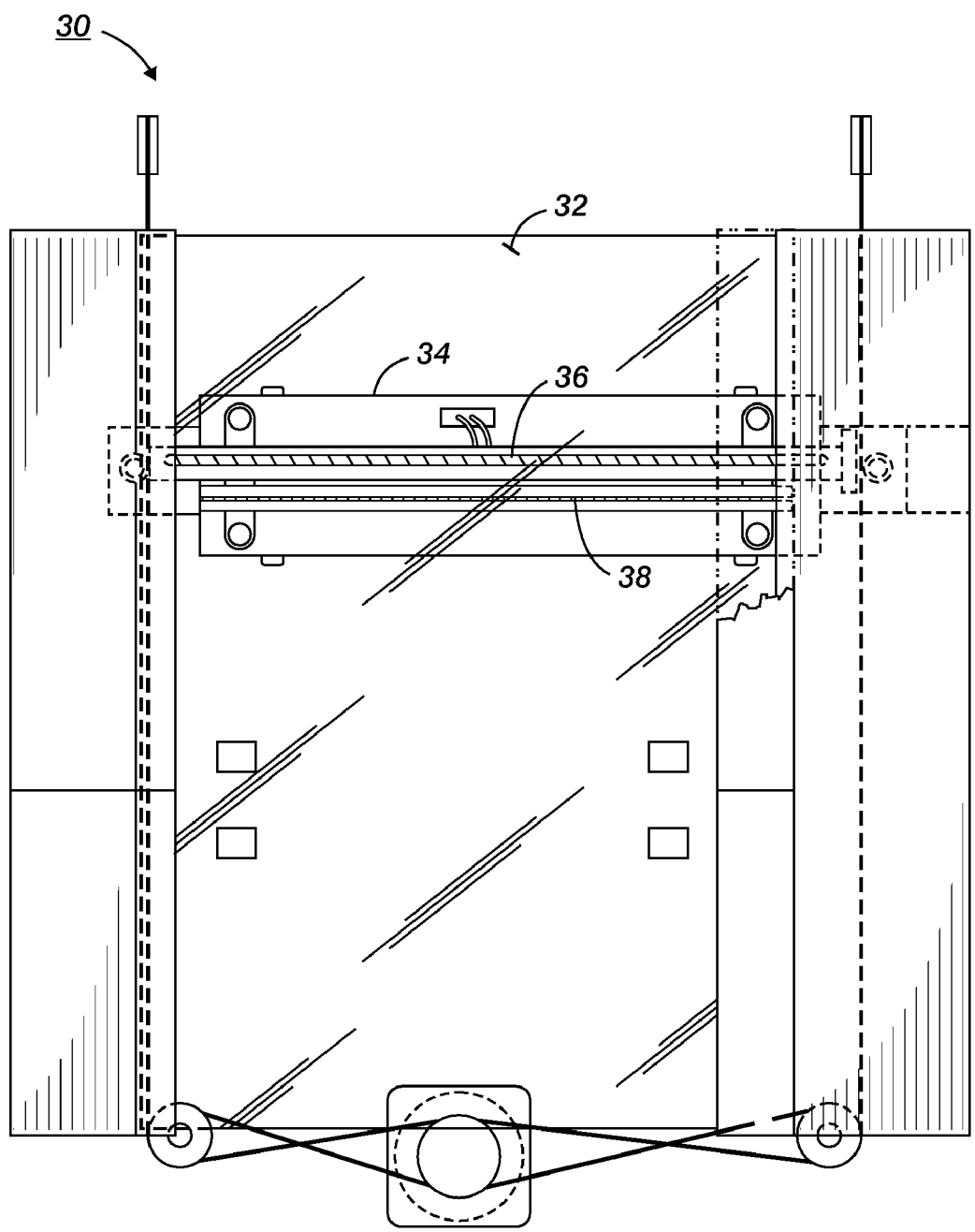
FIG. 2 is a simplified diagram showing the basic elements of a raster input scanner.

Scanners, digital cameras and other devices that are capable of generating digital image data reproduce color quite differently. An example of a raster input scanner (IIT) 30, one well known image capture device, is illustrated in FIG. 2. As shown IIT 30 may be mounted to a moving carriage assembly 34 and placed below a glass platen 32. A lamp 36 illuminates an original document 50 that is positioned on platen 32 and an image sensor 38, which is typically mounted to carriage 34, is placed in relative motion with platen 32. Image sensor 38 includes a plurality of sensor elements that capture the image by detecting the intensity of light reflected from corresponding locations in the image and storing it as a proportionate electrical charge. In the case of a color image, the sensor elements separately detect red (R), green (G) and blue (B) components of visible light that are reflected from the image. The analog charges for each color component are separately forwarded to IP 20, where they are quantized to generate grayscale pixel values in three overlapping R, G and B image data planes.

Figure 3:
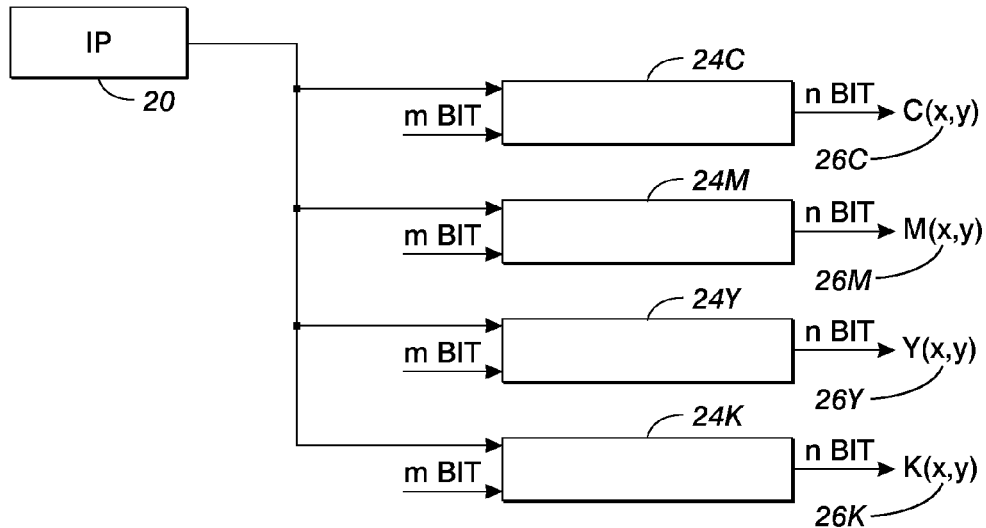
FIG. 3 is a block diagram of one exemplary embodiment of a halftone processor that can be used to convert RGB input to CMYK output.

Since digital input and output devices generate and process data differently, the printing of scanned images usually requires some form of image processing. Turning to FIG. 3, IP 20 typically receives and processes the grayscale RGB image data 32 generated by IIT 30 and performs several processes, one of which includes the conversion of grayscale RGB image data 32 to binary CMYK image data that is suitable for driving printer 10.

The human vision system perceives color using a luminance channel and two opponent chrominance channels, one for detecting red-green chrominance differences and one for detecting blue-yellow chrominance differences. As the goal is to generate CMYK data that will be perceived by human observers as having colors that closely match those of the input image, the conversion of RGB image data to CMYK image data often involves an intermediate conversion to device independent luminance-chrominance data, which simulates the way color is processed by the human eye. For example, LCrCb data describes each color in terms of its luminance (L), red-green chrominance (Cr) and blue-yellow chrominance (Cb). Luminance-chrominance data is forwarded to halftone processing channels 24C, 24M, 24Y and 24K, where it is independently processed to generate binary data for each of the C, M, Y and K separations. The CMYK image data is output over channels 26C, 26M, 26Y and 26K that are used to deposit colorants in each of the C, M, Y and K separations.

The human eye is much more sensitive to overall changes in luminance (i.e., brightness) than it is to changes in chrominance in small objects or areas. Accordingly, images are typically printed on output media using colorants that have dissimilar luminance values. For example, many images are generated by printing black colorant on a white background. In a digital system that describes color values in 8-bit words, white has a grayscale value of R=255, G=255, B=255, which translates to a luminance-chrominance value of L=255, Cr=128, Cb=128 and black has a grayscale value of R=0, G=0, B=0, which translates to a luminance-chrominance value of L=0, Cr=128, Cb=128. Since the luminance variation between the colorant and background media is high (and in fact in this case, represents the maximum possible difference), the image that is displayed is easily detected.

If the colorant used to print the image instead had a luminance value that was similar to that of the background media, the image would be substantially invisible to the human eye so long as the image was sufficiently small. For example, yellow has a grayscale value of R=255, G=255, B=0, which translates to a luminance-chrominance value of L=225, Cr=149, Cb=1. Since the luminance of yellow and white are almost the same, a yellow image printed on a white background would be virtually undetectable. Similarly, blue has a grayscale value of R=0, G=0, B=255, which translates to a luminance-chrominance value of L=29, Cr=108, Cb=255, which varies only slightly from that of black and thus, a tiny blue image printed on a black background would also be virtually undetectable. While small luminance variations are likely to be undetected by the human eye, they are typically captured by a digital scanner.

Figure 4:
FIG. 4 is an example of a redundantly encoded image printed on a hardcopy document.

Turning to FIG. 4, present systems and methods can be used to generate a redundantly encoded image 55 that includes a visible image with a substantially invisible duplicate (a "redundant image") 44 of an original image printed inside. When initially created, the visible portion of redundantly encoded image 55 is an original image 42. But like any printed image, redundantly encoded images 55 can be printed, digitally captured and perhaps modified by those who receive it. However, the presence of redundant image 44 enables a redundantly encoded image 55 that is digitally captured to be processed to recreate original image 42. Accordingly, present systems and methods allow those who receive printed images to determine whether the visible image that has been presented is the same as original image 42 and to recover an original image 42 from a modified version. Present systems and methods can also be used to recapture original images 42 from a hardcopy document 50 that has been damaged.

Like original image 42, redundant image 44 is generated by depositing a colorant onto an output sheet in response to signals that are generated by IP 20. However, unlike original image 42, redundant image 44 is printed in a color with a luminance value that closely matches that of the output sheet. Redundant image 44 is typically generated by transmitting image signals 18 to printer 10 over a halftone processing channel that will cause a colorant with a selected luminance to be deposited onto the output sheet. More specifically, the luminance value for the color of redundant image 44 will closely match the luminance value for the color of the output sheet. In such cases, redundant image 44 will be substantially invisible to the human eye, but still captured by IIT 30. Since the same set of image data signals is used to generate both original image 42 and redundant image 44, the image data that is captured from redundant image 44 can be used to recreate original image 42.

It is quite common for an IP 20 to transmit image data 18 to printer 10 over the channel corresponding to black colorant to black print a black original image 42 on a white output sheet. In one aspect, a redundant image 44 may be generated by retransmitting the image data 18 over the channel corresponding to yellow colorant to print a yellow redundant image 44 on the same output sheet. Accordingly, only blue and yellow light will be reflected from the regions of document 50 where redundant image 44 is displayed. Further, if redundant image 44 is generated by printing the image in yellow in background regions of original image 42 and in blue in content regions, the small luminance differences between the yellow image and white background and between the blue image and black content will render the entire redundant image 44 substantially invisible to the human eye. Accordingly, redundant image pixels can be printed in both background regions (i.e., where the grayscale value is equal to the maximum available value) and content regions (i.e., where the grayscale value is less than the maximum value) of original image 42.

Notably, present systems and methods are not limited to encoding binary image data. The pixel value for each pixel in a grayscale redundant image 44 can be represented as:

$R(i', j')=W(i, j)$ $G(i', j')=W(i, j)$ $B(i', j')=W(i, j)*W(i', j')+(1-W(i, j))*(1-W(i', j'))$, where W=1 at white pixels; W=0 at black pixels; pixels in original image 42 are located in positions (i, j); pixels in redundant image 44 are located in positions (i', j'); W(i, j) is the grayscale value at pixel (i, j); and the red, green and blue output values at pixels (i', j') are R(i', j'), G(i', j') and B(i', j').

In one aspect, the print locations for pixels in redundant image 44 are modified before they are printed in original image 42. More specifically, in one aspect, the coordinates for redundant image pixels are scrambled relative to the coordinates of the corresponding original image pixels. Accordingly, redundant image 44 is scattered across the surface of the original image, with each pixel positioned in a location that is selected using an encoding transformation function $(T_E)$. When the redundant information is scattered across the original image, the original data is much more likely to be recoverable from a document 50 that has been damaged or altered.

In one aspect, pixels in redundant image 44 are located by measuring the intensity of light reflected from the image that has a selected color. In the example described above, redundant image 44 includes those pixels where the color value has a yellow-blue intensity (YB) that exceeds a predetermined threshold (t). That is, YB=|B−(R+G)/2|−|R−G|>t. In other words, a given pixel is identified as belonging to redundant image 44 when its color value is dominated by signals that correspond to the blue-yellow chrominance channel (Cb).

Each pixel in original image 42 is identified by coordinates (i, j) that specify its location inside the image in the fast scan (i) and slow scan (j) direction. Accordingly, each pixel within the same line will have the same "j" coordinate and pixels that are aligned in the same column in different scanlines will have the same "i" coordinate. In one aspect, the location of each pixel in redundant image 44 that represents a content location in original image 42 can be identified using an encoding transformation function $(T_E)$ that modifies the coordinates of the corresponding original image 42 pixel.

Figure 5:
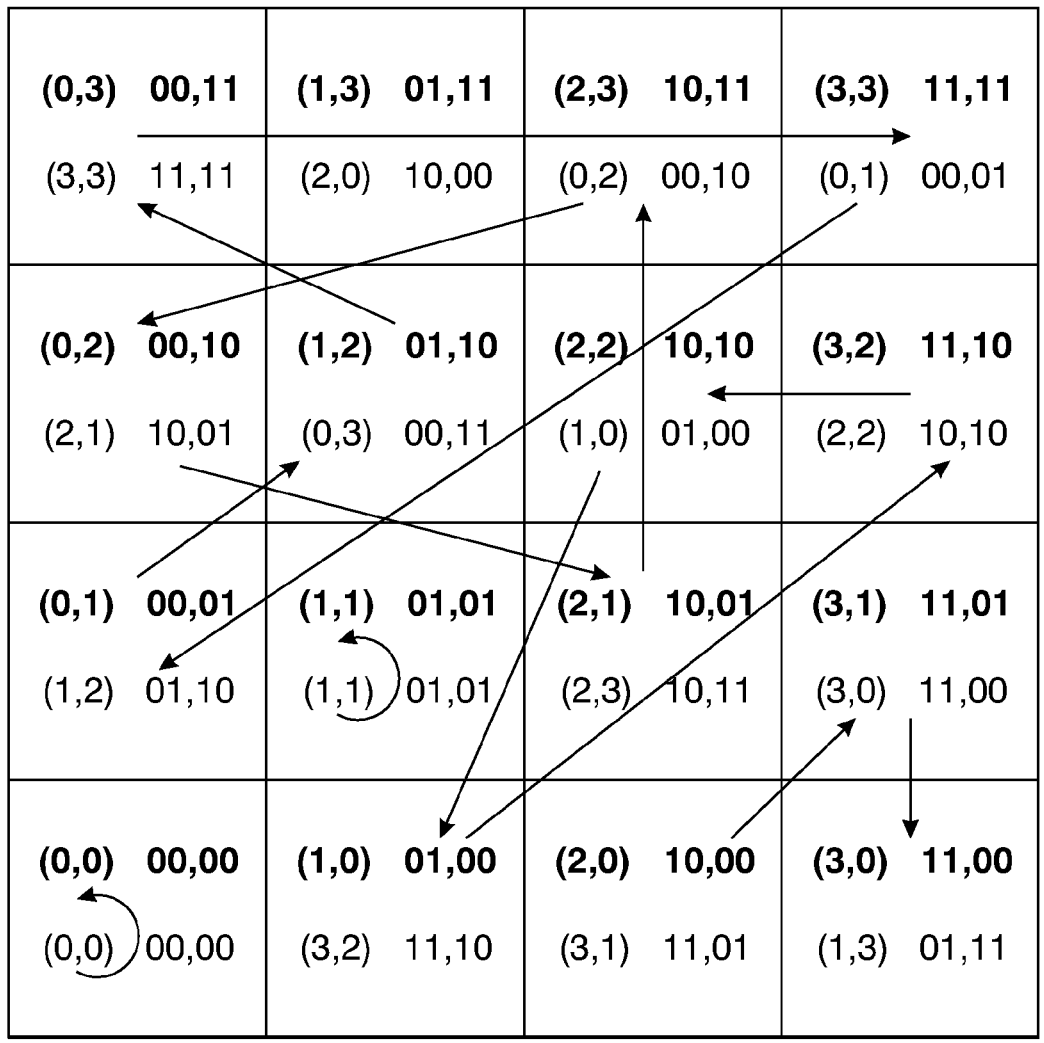
FIG. 5 shows an example of how pixels in a redundant image can be mapped to locations in a visibly presented image.

An encoding transformation function that can be used to map the original image to corresponding pixels in a redundant image 44 is illustrated in FIG. 5. In the example shown, redundantly encoded image 55 has been encoded in the original image using the function: $T_E(i', j')$=[i'=reversebits(i+j); j'=reversebits(j+i')]. The encoding function of this example first adds the relevant coordinates (i.e., i+j or i+j'). The addition is done modulo the image size, so for an image size that is a power of two this drops the first half of the bits in the resulting sum and the reversebits function reverses the order of the remaining bits. The coordinates (i, j) for each pixel location in the 4×4 block are displayed in bold text at the top of each box along with the corresponding binary value. The coordinates (i', j') for the corresponding locations selected by the transformation function are displayed in outlined text at the top of each box with the corresponding binary value. Arrows are also provided to show the correspondence between pixels in the original redundant images.

In an original image 42 that has content placed, for example, at the pixels in locations (3, 0) and (1, 3) and nothing placed at the pixel in location (2, 0), redundant image 44 would be printed at locations (1, 3) and (2, 0), which correspond to original image pixels (3, 0) and (1, 3) respectively. Location (3, 1), (2, 0), which correspond to original image pixel (2, 0) would not display any redundant image data. Accordingly, both original image 42 and redundant image 44 will be displayed at the pixel at location (1, 3) and that location of redundant image 44 would be printed in blue. Since the redundant image pixel printed at location (2, 0) is in the background of original image 42, redundant image 44 will be printed in yellow at that location.

It is noted that redundant image 44 and original image 42 do not have to be printed at the same resolution. For example, on some occasions, redundant image 44 may be printed in a relatively low resolution to ensure that the output of each pixel will print clearly. In one aspect, the resolution may be chosen to accommodate the requirements of the function $T_E$. For example, the reverse bits transformation function can only be applied to visible images 42 with dimensions that are defined by powers of two.

Some visible images 42, i.e., those with a large amount of background or content, may appear to have a slight yellow color cast over the background region and/or a slight blue color cast over the content region. The intensity of this color can be greatly reduced if a predictive coding or other compression procedure is applied to the image data before redundant image 44 is printed. For example, the coordinates of each pixel can be used to predict those of the next pixel and the prediction errors can be encoded as visible content. While the use of predictive encoding may confirm the validity of redundant image 44, incorrect values in the predictive image typically affect more than a single pixel value, which may make it more difficult to restore original image 42. In such cases, interpolation and other data processing techniques may be necessary to restore the values that are altered through predictive encoding.

A redundantly encoded image 55 that has been printed using a system and method such as that described can be digitally captured (e.g., scanned) and redundant image 44 can be processed to recreate original image 42. As explained above, in addition to a visible image 57, redundantly encoded image 55 includes a redundant image 44 that has been printed on document 50 in locations that are defined by encoding function $T_E$. Original image 42 can be recreated from a digitally captured redundantly encoded image 55. Generally, present systems and methods apply a decoding transformation function ($T_D$), which is typically the inverse of function ($T_E$) to each pixel in the captured image 54 that corresponds to pixel in redundant image 44. A grayscale value that can be easily detected by the human eye can then be assigned to pixels that are identified by the decoding transformation function. If none of the information printed on document 50 has been modified, visibly presented image 57 will be identical to original image 42.

Figure 6:
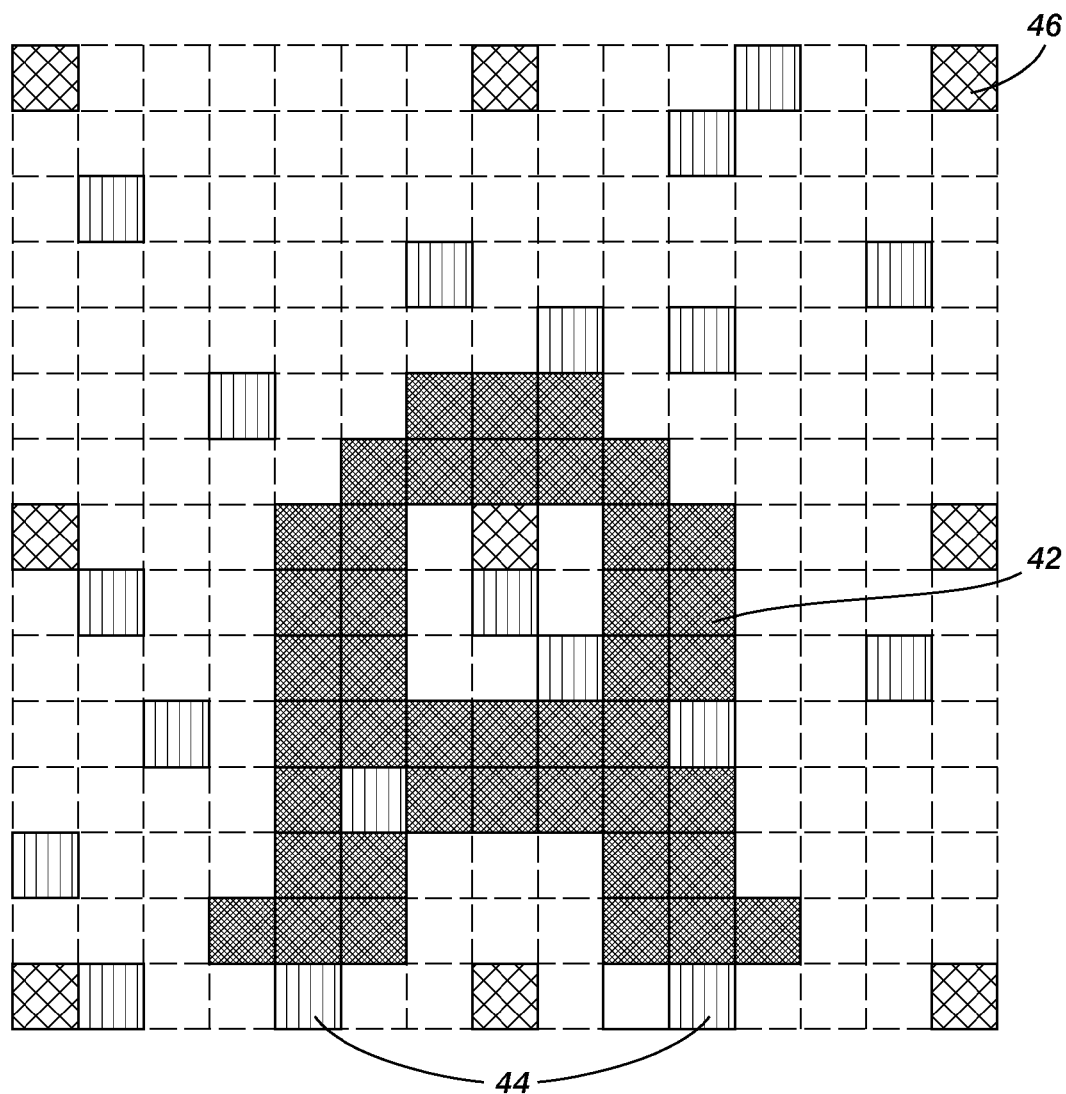
FIG. 6 is an example of a redundant image that includes registration marks.

Referring to FIG. 6, registration marks 46 may optionally be printed in redundant image 44 during encoding to aid in recovering visible image 42. In one aspect, registration marks 46 may be printed in redundant image 44 in response to signals that are transmitted over the channel of printer 10 that controls the deposit of yellow colorant. In another aspect, registration marks 46 may be printed using the cyan, magenta or other color channel. In still another aspect, registration marks 46 may be printed in redundant image 44 in a predetermined manner, for example, at periodically spaced intervals or at specified locations (e.g., corners, centers, etc.) within blocks of pixels that have a specified size and shape or are arranged in some other known pattern.

In one aspect, a redundant image 44 that has been encoded using the transformation function $T_E$ with reference to FIG. 5, i.e., (i', j')=[i'=reversebits(i+j); j'=reversebits(j+i')], may be decoded using an inverse transformation function $T_D$(i, j)= [i=reversebits(i')−j'; j=reversebits(j')−i], where mod operations may be required to confine i and/or j to the image dimensions.

Figure 7:
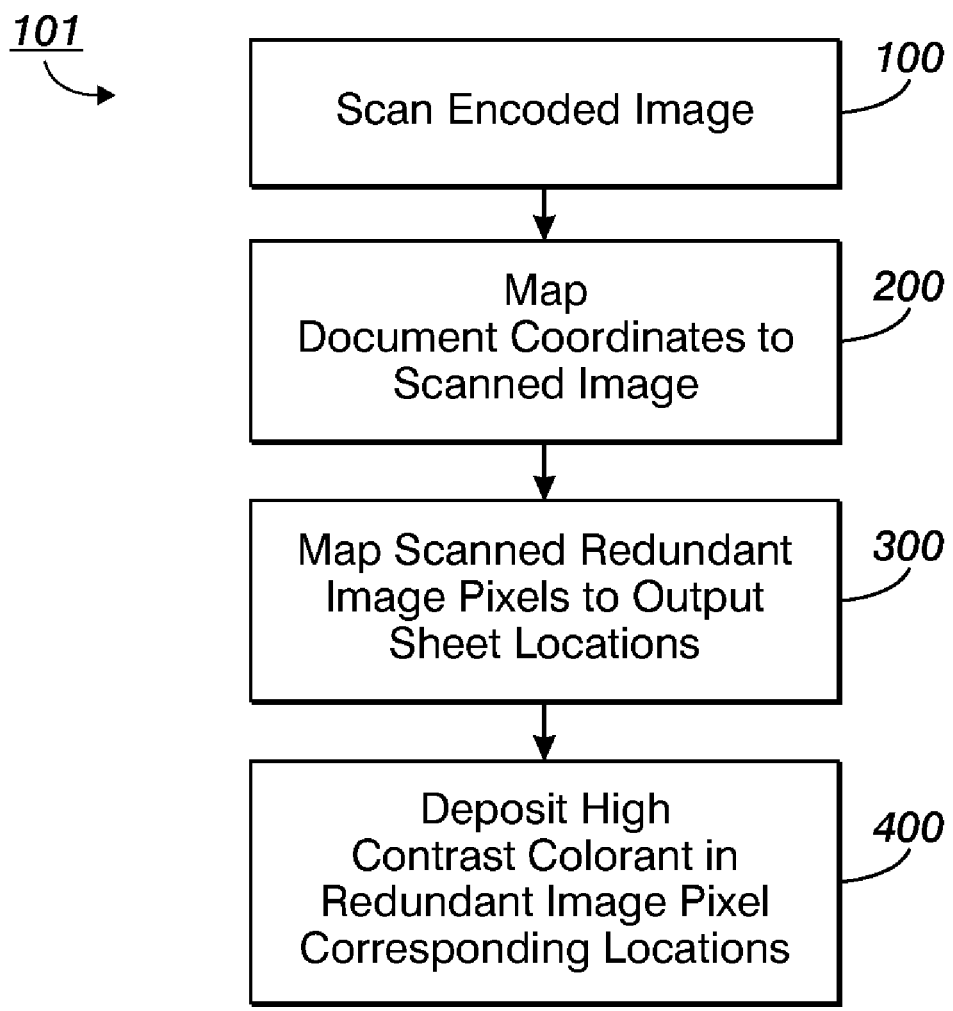
FIG. 7 is a flow chart that illustrates a method of recovering an original image from a redundantly encoded printed image.

An exemplary method 101 of recovering visible image 42 from an encoded image 55 printed on a document 50 is shown in the block diagram of FIG. 7. Encoded image 55 is digitally captured at block 100 by scanning a document 50 that has been positioned on platen 32. Since platen 32 will usually accommodate documents 50 that have different sizes, scanned data 54 will typically include pixels that represent the backing roll or scanner cover and other scanner hardware as well as document.

IIT 30 may capture images at a resolution that differs from that used to print encoded image 55. Document 50 may also have become misaligned when it was placed on platen 32, which may cause scanned image 54 to become rotated and/or translated relative to encoded image 55. Accordingly, the geometrical transformation ($T_G$) between the coordinates of pixels in scanned image 54 and the corresponding locations of document 50 is next identified at block 200. $T_G$ can be used to identify the position of each pixel in redundant image 44 within scanned image 54.

Still referring to FIG. 7, at block 300, $T_D$ is applied to the pixels in scanned image 54 that correspond to redundant image 44 and determining whether a blue or yellow dot has been placed in the corresponding location. This mapping can include local adjustments based on examination of the positions of nearby registration points. If a yellow or blue dot is found in the selected scanned image location, a black pixel is printed at block 400 in the location obtained through inverse encoding of the current position.

Figure 8:
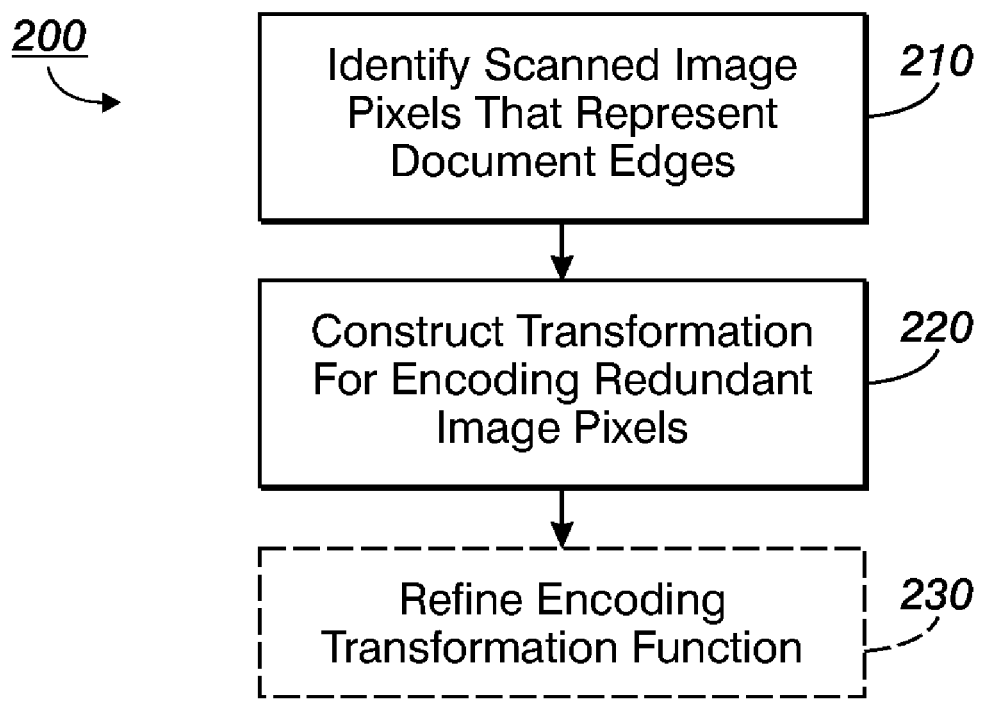
FIG. 8 is a flow chart showing a method of deriving a transformation function.

One way to determine transformation $T_G$ is illustrated in FIG. 8. The edges of document 50 are first located inside scanned image 54 at block 210 using, for example, one of several known edge detection processes. For example, pixels at the boundaries that lie between regions with distinct graylevel properties can be identified and the pixel coordinates can be used to fit lines to the top, bottom, left and right edges of document 50. More specifically, starting at the top of the scan, the grayscale value for each pixel can be analyzed to until a plurality of non-white pixels are located together. The number of white pixels that should be analyzed will depend upon the parameters of system 10, but should be sufficient to rule out the possibility of noise. The locations of these non-white pixels can be entered into a least-squares fit of a line to the edge and the left-most and right-most non-white pixels on the line noted. Subsequent lines can then be processed to capture any non-white pixels that lie outside the previously identified range until the distance between two non-white pixels in a single scan line equals the scanner resolution in the fast scan direction. The least-squares fit can then be applied to the collected points to provide the leading edge. An analogous process can be used to fit lines to the bottom, left and right sides.

Once the pixels of scanned image 54 that correspond to the edges of document 50 are identified, function $T_G$ is constructed at block 220 using the coordinates for pixels of the boundaries identified at block 210 and the dimensions of document 50, which are known. Function $T_G$ may optionally be refined at block 230 to provide a precise mapping between pixels in scanned image 54 and corresponding pixels in encoded image 55.

A process that can be used to refine a function $T_G$ is illustrated in FIG. 9. In the example of FIG. 9, encoded image 55 includes registration marks 46 that have been printed at the corners of 16×16 blocks of pixels. However, it is understood that registration marks may be printed in other patterns and that the main goal is to provide registration marks 46 that can be easily printed and captured. Starting with the first pixel in the first scan line (blocks 231 and 232), the neighborhood surrounding each pixel in scanned image 54 is analyzed to determine whether a registration mark is present. More specifically, at block 233 the grayscale value of the pixel is compared to a threshold value $t_R$ that is used to identify registration marks 46. In a redundant image 44 printed in blue and yellow, registration marks will be found where |B−(R+G)/2|−|R−G|>$t_R$.

The neighborhood surrounding each registration mark pixel is then examined at block 234 to identify pixels have a higher intensity value for the selected color. If any of the surrounding pixels have higher intensity values, their coordinates are entered into a least squares fit at block 235 and $T_G$ will be adjusted further. No further adjustment is made if none of the surrounding pixels have higher intensity values. Processing continues at blocks 236-238 until each pixel in scanned image has been analyzed as shown at block 239.

Each adjustment to $T_G$ can be used to predict the position of the next registration mark 46, which will allow the adjustments to follow progressively drifting errors. The effects of noise in the adjustment calculations can be reduced by updating the mapped registration mark 46 location with an average of several nearby previously calculated adjustments, rather than with a single previously adjusted value. If desired, the refined transformation could also be concatenated with the original transformation function (from block 220 of FIG. 8). Any or all of these processes can be repeated to increase the accuracy of the transformation function.

While present systems and methods are described using redundantly encoded images 55 as being printed on white paper, with visible image 42 printed in black and redundant image 44 printed in blue and yellow, it is understood that redundant image 44 could be printed in other colors and/or on non-white output sheets. Generally, redundant image 44 will be substantially invisible so long as the luminance of the colorant used to print it varies only slightly from the media on which it is printed. For example, image data signals may be transmitted over the magenta print channel to redundantly encode an image 55 on a red output sheet (i.e., R=255, G=0, B=0; L=76, Cr=255, Cb=86), by printing redundant image 44 in magenta (i.e., R=255, G=0, B=255; L=105, Cr=234, Cb=212) and printing visible image 42 in dark green (i.e., R=0, G=128, B=0; L=75, Cr=75, Cb=86).

Although the invention has been described with reference to specific embodiments, it is not intended to be limited thereto. Rather, those having ordinary skill in the art will recognize that variations and modifications, including equivalents, substantial equivalents, similar equivalents, and the like may be made therein which are within the spirit of the invention and within the scope of the claims.

What is claimed is:

1. A method, comprising:
generating image data that provides a digital representation of an original image;
providing an encoding transformation function for positioning pixels of a substantially invisible representation of said original image inside said original image, wherein the encoding transformation function scrambles coordinates for the substantially invisible representation of said original image based on coordinates of the original image;
printing said original image on an output copy sheet; and
printing said substantially invisible representation of said original image on said output copy sheet, with said pixels of said substantially invisible representation of said original image dispersed among said original image according to said encoding transformation function.

2. A method as claimed in claim 1 wherein said original image is printed by depositing black colorant onto a white output sheet and said substantially invisible representation of said original image is printed by depositing blue and yellow colorant onto said white output sheet, with yellow colorant deposited on said white output sheet in background-region-corresponding locations of said original image and blue colorant deposited on said white output sheet in content-region-corresponding locations of said original image.

3. A method as claimed in claim 1 wherein a print resolution of said substantially invisible representation of said original image differs from a print resolution for said original image.

4. A method as claimed in claim 1 further comprising compressing said image data representing said original image prior to generating said substantially invisible representation of said original image and printing said substantially invisible representation of said original image.

5. A method as claimed in claim 1 wherein pixels in said substantially invisible representation of said original image are dispersed among corresponding pixels of said original image using a function: j'=reversebits(i+j); i'=reversebits(j'+i), wherein (i, j) are coordinates of said pixels of said original image and (i', j') are coordinates for corresponding pixels in said substantially invisible representation of said original image.

6. A data encoder, comprising:
an input channel configured to receive pixel values that digitally represent an original image;
a redundant image pixel selector configured to provide an encoding transformation function that maps pixels belonging to a substantially invisible representation of said original image to corresponding pixels in a visible representation of said original image, wherein the encoding transformation function scrambles coordinates of the pixels for the substantially invisible representation of said original image based on coordinates for the pixels of the original image;
a visible image generator configured to print said visible representation of said original image on an output copy sheet using a colorant whose luminance value differs substantially from a luminance value of a print location for said visible image representation; and
a redundant image generator configured to print said substantially invisible representation of said original image using a colorant whose luminance value is substantially the same as a luminance value for a corresponding pixel according to said encoding transformation function.

7. A data encoder as claimed in claim 6, wherein said visible image generator is configured to deposit black colorant onto said output copy sheet and said redundant image generator is configured to deposit yellow colorant in a visible image background region of said output copy sheet and is configured to deposit blue colorant in a visible image content region of said output copy sheet.

8. A data encoder, comprising:
an input channel configured to receive pixel values that digitally represent an original image;
a redundant image pixel selector configured to provide an encoding transformation function that maps pixels belonging to a substantially invisible representation of said original image to corresponding pixels in a visible representation of said original image, wherein the encoding transformation function scrambles coordinates of the pixels for the substantially invisible representation of said original image based on coordinates for the pixels of the visible representation of said original image:
a visible image generator configured to visibly display said visible representation of said original image in color whose luminance value differs substantially from a luminance value of a region surrounding said visible representation; and
a redundant image generator configured to display said substantially invisible representation of said original image in a color whose luminance value is substantially the same as a luminance value of a surrounding region.

* * * * *